United States Patent
Struck

(10) Patent No.: US 10,190,641 B2
(45) Date of Patent: Jan. 29, 2019

(54) FLANGED COMPONENT FOR A GAS TURBINE ENGINE

(71) Applicant: SOLAR TURBINES INCORPORATED, San Diego, CA (US)

(72) Inventor: Bruno E. Struck, San Diego, CA (US)

(73) Assignee: Solar Turbines Incorporated, San Diego, CA (US)

(*) Notice: Subject to any disclaimer, the term of this patent is extended or adjusted under 35 U.S.C. 154(b) by 274 days.

(21) Appl. No.: 15/344,129

(22) Filed: Nov. 4, 2016

(65) Prior Publication Data

US 2018/0128321 A1    May 10, 2018

(51) Int. Cl.
| | | |
|---|---|---|
| *F01D 5/02* | (2006.01) | |
| *F01D 11/00* | (2006.01) | |
| *F01D 25/24* | (2006.01) | |
| *F16D 1/076* | (2006.01) | |
| *F01D 5/06* | (2006.01) | |
| *F01D 11/02* | (2006.01) | |

(52) U.S. Cl.
CPC ............ *F16D 1/076* (2013.01); *F01D 5/025* (2013.01); *F01D 5/066* (2013.01); *F01D 11/001* (2013.01); *F01D 11/003* (2013.01); *F01D 11/02* (2013.01); *F01D 25/243* (2013.01); *F05D 2220/32* (2013.01); *F05D 2240/55* (2013.01); *F05D 2250/232* (2013.01)

(58) Field of Classification Search
CPC ........ F01D 25/243; F01D 5/025; F01D 5/066; F01D 11/001; F01D 11/003; F01D 11/02; F16D 1/076; F16D 1/033; F16B 2200/506; F16B 2200/50; F16B 2200/509; F05D 2260/31; F05D 2240/55; F05D 2250/232; F05D 2250/292
See application file for complete search history.

(56) References Cited

U.S. PATENT DOCUMENTS

| | | | |
|---|---|---|---|
| 3,491,630 A | 1/1970 | Mielke | |
| 4,339,217 A | 7/1982 | Lacey | |
| 6,176,663 B1 | 1/2001 | Nguyen et al. | |
| 7,213,999 B2 * | 5/2007 | Haas | F16B 5/0275 403/337 |
| 8,033,579 B2 | 10/2011 | Takeda et al. | |

(Continued)

FOREIGN PATENT DOCUMENTS

| | | |
|---|---|---|
| CN | 201309014 Y | 9/2009 |
| EP | 1777377 | 4/2007 |

*Primary Examiner* — Jonathan P Masinick
(74) *Attorney, Agent, or Firm* — Procopio, Cory, Hargreaves & Savitch LLP

(57) ABSTRACT

A flanged component for a gas turbine engine is disclosed herein. The flanged component includes a flange body with a flange mating surface and a plurality of threaded features. Each threaded feature includes a threaded portion and a relief portion. The threaded portion has threads and extends into the flange body from the flange mating surface. The relief portion extends into the flange body from the flange mating surface located outward from the threaded portion forming a rim portion therebetween. The rim portion includes an upper rim surface having an annular shape. The relief portion includes an inner surface extending from the rim and tapering outward from the upper rim surface.

20 Claims, 4 Drawing Sheets

(56) References Cited

U.S. PATENT DOCUMENTS

| | | |
|---|---|---|
| 8,287,005 B2 | 10/2012 | Leslie et al. |
| 8,371,785 B2 * | 2/2013 | Babej .................... F16B 37/062 411/180 |
| 9,169,728 B2 | 10/2015 | Wallace et al. |
| 2005/0053419 A1 | 3/2005 | McMillan et al. |
| 2014/0014792 A1 | 1/2014 | Willis et al. |
| 2014/0260321 A1 | 9/2014 | McClellan, IV et al. |

* cited by examiner

FLANGED COMPONENT FOR A GAS TURBINE ENGINE

TECHNICAL FIELD

The present disclosure generally pertains to a flanged component for a gas turbine engine, and is directed toward a flanged component with reduced stress threaded holes for a fastened joint of flanged components.

BACKGROUND

Gas turbine engines include compressor, combustor, and turbine sections. Multiple flanged components within the gas turbine engine, in the spinning and static sections of the compressor and turbine, may be bolted together. On some flanges threaded bolt holes may be used. Stress concentrations may arise at the bolt threads, such as at or near the first engaged thread of the fastened joint.

U.S. Pat. No. 8,371,785 to Babej et al. discloses relates to a rivet nut with a base part and a cylindrical rivet section, the base part having a central threaded cylinder, an annular contact surface that is coaxial to the threaded cylinder in a plane perpendicular to the longitudinal axis of the threaded cylinder, and that has an axially aligned annular groove, said groove being arranged radially inside the annular contact surface and radially outside the cylindrical rivet section and said groove blending, on the radially inner side, into the outer surface of the cylindrical rivet section, and antirotation ribs being provided in the area of the annular groove. The invention is characterized in that the annular groove, when seen in an axial cross-sectional plane, has a U-shaped cross-section with a radially outer lateral wall which is relatively steep and which has, at the steepest point, an inclination to the center longitudinal axis of the rivet nut in the range of approximately 45 DEG to approximately −20 DEG, preferably of approximately 30 DEG to approximately 0 DEG. The volume of the annular groove is chosen in such a manner that across a range of sheet thicknesses adapted to the respective thread size there is room for the volume of the respective folded region of the rivet section inside the annular recess (80) that is formed by molding the sheet part into the annular groove of the element and that it does not project beyond the side of the molded sheet facing away from the annular contact surface.

The present disclosure is directed toward overcoming one or more of the problems discovered by the inventors or that is known in the art.

SUMMARY OF THE DISCLOSURE

A flanged component for a gas turbine engine is disclosed herein. The flanged component includes a flange body and a plurality of threaded features. The flange body includes a flange mating surface that mates with a second mating surface of a second flanged component. Each threaded feature includes a threaded portion and a relief portion. The threaded portion has threads for receiving a threaded fastener and extends into the flange body from the flange mating surface along a feature axis. The relief portion extends into the flange body from the flange mating surface located outward from the threaded portion relative to the feature axis forming a rim portion therebetween. The rim portion includes an upper rim surface having an annular shape parallel to the flange mating surface. The relief portion includes an inner surface on the rim portion extending from the upper rim surface and away from the flange mating surface. The inner surface having a frustoconical shape that tapers outward from the upper rim surface.

DETAILED DESCRIPTION

The systems and methods disclosed herein include a flanged component for a fastened joint of flanged components in a gas turbine engine. In embodiments, the flanged component includes a threaded feature with a threaded portion and a relief portion. The threaded portion includes threads and may extend through the flanged component. The relief portion may be an annular groove extending into the flanged component adjacent to the first engaged thread and may be located outward from the threaded portion. The relief portion may reduce the stresses, such as stress on the first engaged thread of the fastener and the flanged component, which may increase the service life of the fastener and the flanged component. In embodiments, a rim portion may be formed between the threaded portion and the relief portion. The rim portion may be recessed into the flanged component, which may further reduce the stresses in the flanged component.

Figure 1:
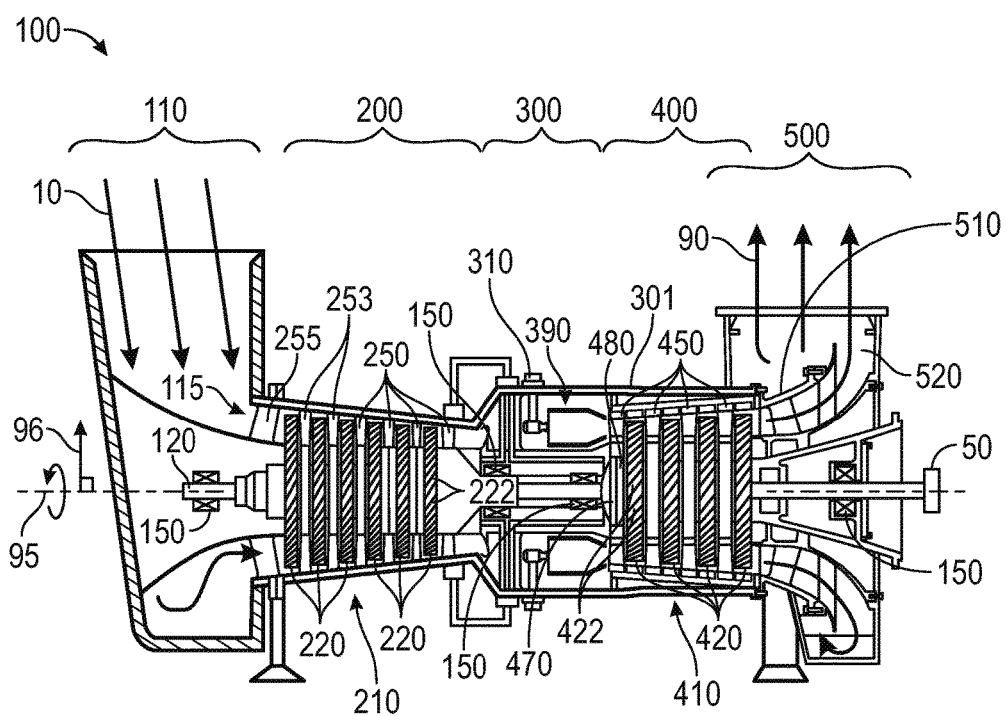
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from center axis 95, wherein a radial 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 50. The gas turbine engine 100 may have a single shaft or a dual shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes a combustion chamber 390 and one or more fuel injectors 310. The fuel injectors 310 may be upstream of the combustion chamber 390 and may be annularly arranged about center axis 95.

The turbine 400 includes a turbine rotor assembly 410 and turbine nozzles 450. The turbine rotor assembly 410 mechanically couples to the shaft 120. In the embodiment illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520. The power output coupling 600 may be located at an end of shaft 120.

Various components of the gas turbine engine 100 may include flanges. Multiple flanged components may be fastened together. The center axis 95 may also be the axis for the flanged components. For example, the turbine rotor assembly 410 may include an aft turbine flanged component 480, which may be integral to a turbine disk, and a turbine seal 470 fastened to the aft turbine flanged component 480. The turbine seal 470 may prevent unwanted air from leaking from the combustor 300 to the turbine 400.

Figure 2:
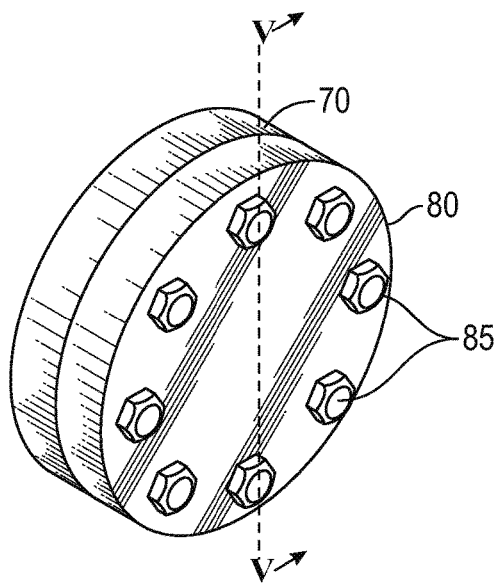
FIG. 2 is a perspective view of an exemplary fastened joint of flanged components.
Figure 4:
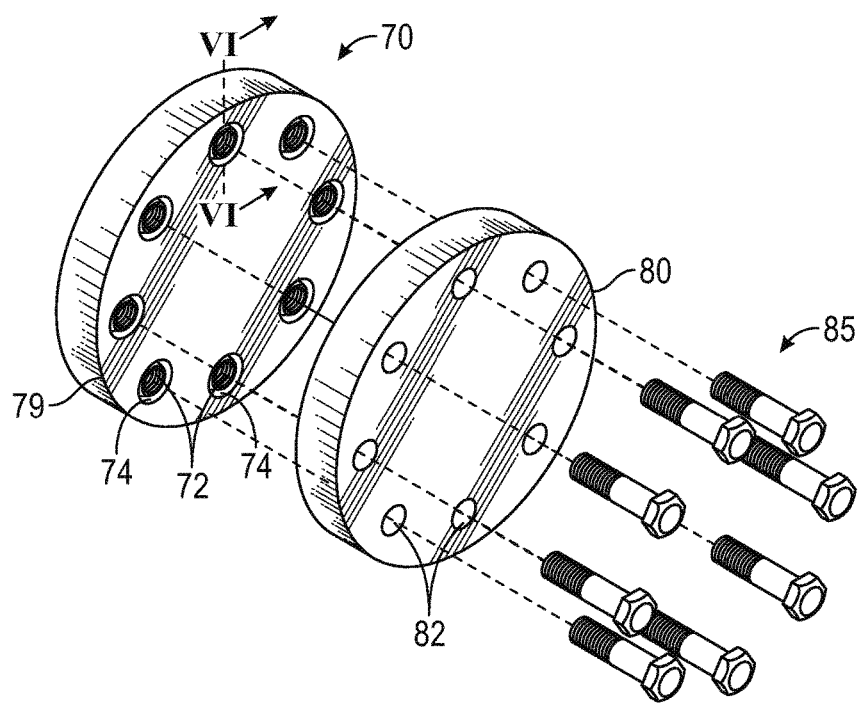
FIG. 4 is an exploded view of the exemplary fastened joint of FIG. 2.

FIG. 2 is a perspective view of an exemplary fastened joint of flanged components. FIG. 4 is an exploded view of the exemplary fastened joint of FIG. 2. Referring to FIGS. 2 and 4, a first flanged component 70, such as the turbine seal 470 of FIG. 1, may adjoin and be fastened to a second flanged component 80, such as the aft turbine flanged component 480, by fasteners 85, such as bolts or screws.

Figure 3:
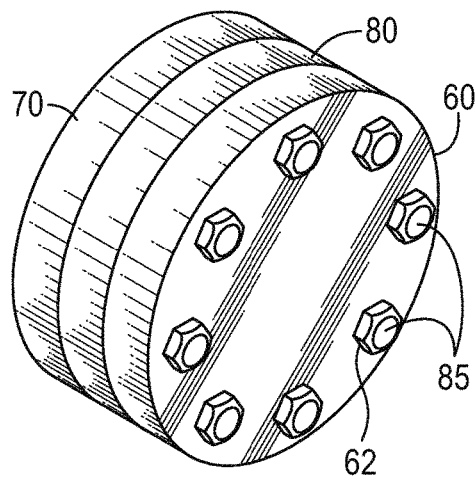
FIG. 3 is a perspective view of an alternate embodiment of the fastened joint of flanged components.

FIG. 3 is a perspective view of an alternate embodiment of the fastened joint of flanged components. As illustrated in FIG. 3, multiple flanged components with through holes may be fastened to the first flanged component 70. In the embodiment illustrated, the fastened joint also includes a third flanged component 60. The third flanged component 60 may adjoin the second flanged component 70. The third flanged component 60 may also include through holes 62 that the fasteners 85 are inserted into. The fasteners 85 may pass through the third flanged component 60, then the second flanged component 80, and then be fastened to the first flanged component 70. The third flanged component 60 may include all of the features of the second flanged component 80 described herein.

Figure 5:
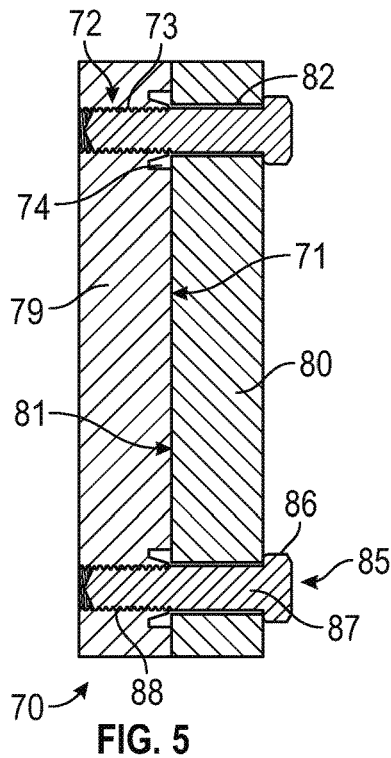
FIG. 5 is a cross-sectional view of the exemplary fastened joint of FIG. 2 taken along line V-V of FIG. 2.

FIG. 5 is a cross-sectional view of the exemplary fastened joint of FIG. 2 taken along line V-V of FIG. 2. Referring to FIGS. 4 and 5, the first flanged component 70 may include a flange body 79 and threaded features 72, and the second flanged component 80 may include fastener holes 82 and a second mating surface 81. The flange body 79 may include a disk or annular shape. The fastener holes 82 may be through holes which, may not be threaded. The fastener shanks 87 may pass through the fastener holes 82 and be threaded into the threaded features 72, loading the fastener heads 86 against the second flanged component 80. The second mating surface 81 may adjoin the flange mating surface 71. In other embodiments, the fastener heads 86 may be threaded against the outermost flanged component, such as the third flanged component 80 of FIG. 3.

Figure 6:
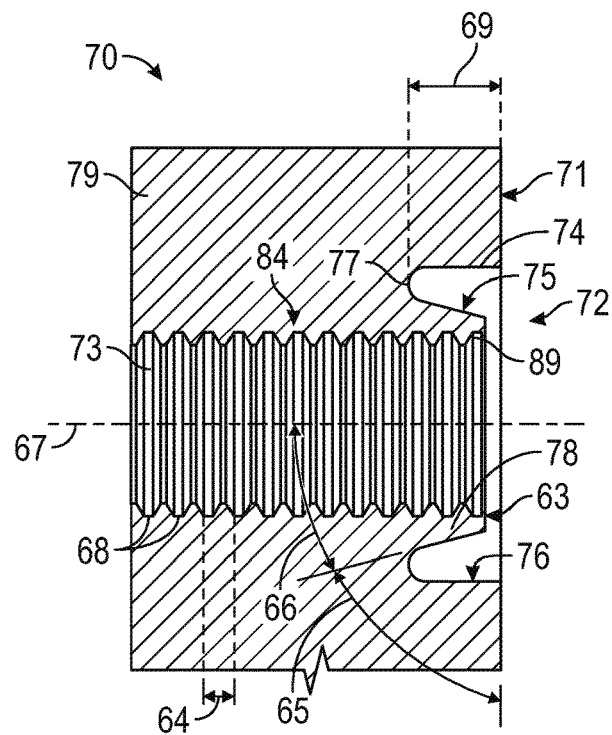
FIG. 6 is a cross-sectional view of a portion of the flanged component of FIGS. 2-4 taken along line VI-VI of FIG. 4.

FIG. 6 is a cross-sectional view of a portion of the first flanged component 70 of FIGS. 2 and 4-5 taken along line VI-VI of FIG. 4. Referring to FIGS. 5 and 6, the first flanged component 70 includes a flange mating surface 71, which is the surface that adjoins and contacts the second flanged component 80. Referring to FIG. 5, each threaded feature 72 may include a threaded portion 73, a relief portion 74, and a rim portion 78. The threaded portion 73 is a threaded hole extending into the flange body 79 from the flange mating surface 71. The threaded portion 73 may be a through hole extending through the flange body 79 or may be a blind hole extending partially into the flange body 79 from the flange mating surface 71. The threaded portion 73 includes threads 84 with a first engaged thread 89. The first engaged thread 89 may be the thread 84 or crest 68 closest to the flange mating surface 71 and closest to the fastener head 86. The threaded portion 73 includes a pitch 64, which consists of the distance between adjacent crests 68 of the threaded portion 73. The threaded portion 73 may include and extend along a feature axis 67. The feature axis 67 may be normal to the flange mating surface 71.

The relief portion 74 is located outward from the threaded portion 73, such as radially outward relative to the feature axis 67. The relief portion 74 extends into the flange body 79 from the flange mating surface 71 and may extend in the axial direction of the feature axis 67. In some embodiments, the relief portion 74 may extend into the flange body 79 from the flange mating surface 71 at a depth 69 from 2 to 3 times the pitch 64 of the threaded portion 73. In other embodiments, the relief portion 74 extends into the flange body 79 2 to 3 times the pitch 64 from the first engaged thread 89.

The relief portion 74 may have an annular shape. The relief portion 74 may include an inner surface 75, an outer surface 76, and a recess base 77. The inner surface 75 extends into the flange body 79 away from the flange mating surface 71. The inner surface 75 may taper outward the further the inner surface 75 extends from the flange mating surface 71 and may include a frustoconical shape. The inner surface 75 may taper at an angle 65 relative to the flange mating surface 71 from 60 degrees to 85 degrees, and may taper at an angle 66 relative to the feature axis 67 from 5 degrees to 30 degrees.

The outer surface 76 may extend into the flange body 79 from the flange mating surface 71. The outer surface 76 is offset from the inner surface 75. The outer surface 76 may have a right circular cylinder shape. The recess base 77 may define the depth 69 of the relief portion 74 and may form the transition between the outer surface 76 and the inner surface 75. In the embodiment illustrated, the recess base 77 is rounded and has an annular shape.

The rim portion 78 is located between the threaded portion 73 and the relief portion 74 and may be formed therebetween. The rim portion 78 may have an annular shape. The rim portion 78 may include an upper rim surface 63, which may be an annular surface that is parallel to the flange mating surface 71. The upper rim surface 63 should be recessed into the flange mating surface 71 or may be recessed into the flange body 79 relative to the flange mating surface 71. In some embodiments, the upper rim surface 63 does not contact the second mating surface 81 until the fasteners 85 are tightened down. In other embodiments, the upper rim surface 63 is offset do a degree such that the upper rim surface 63 does not contact the second mating surface 81 after the fasteners 85 are tightened down.

Figure 7:
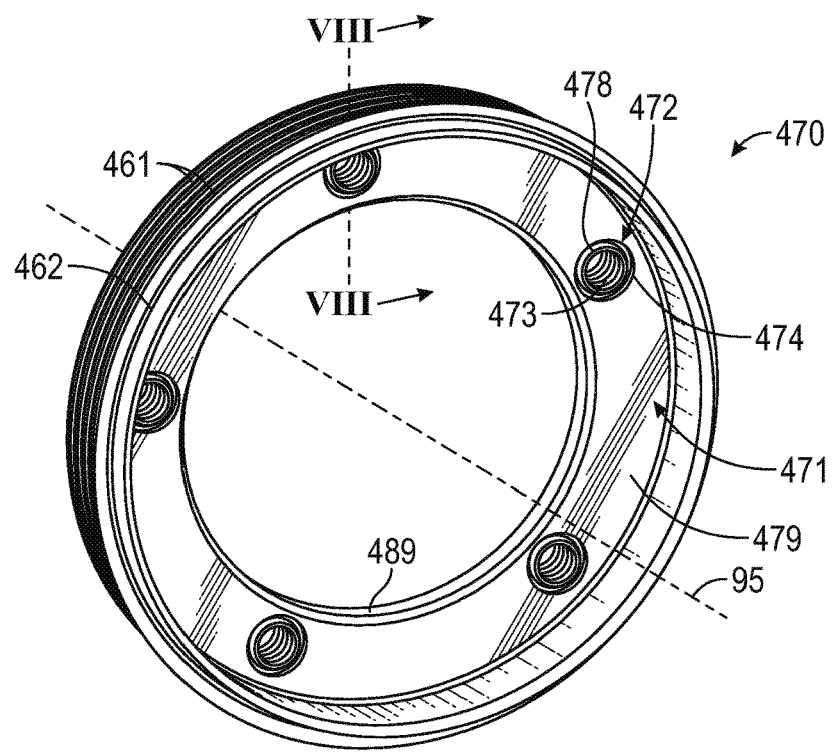
FIG. 7 is a perspective view of the turbine seal of FIG. 1.
Figure 8:
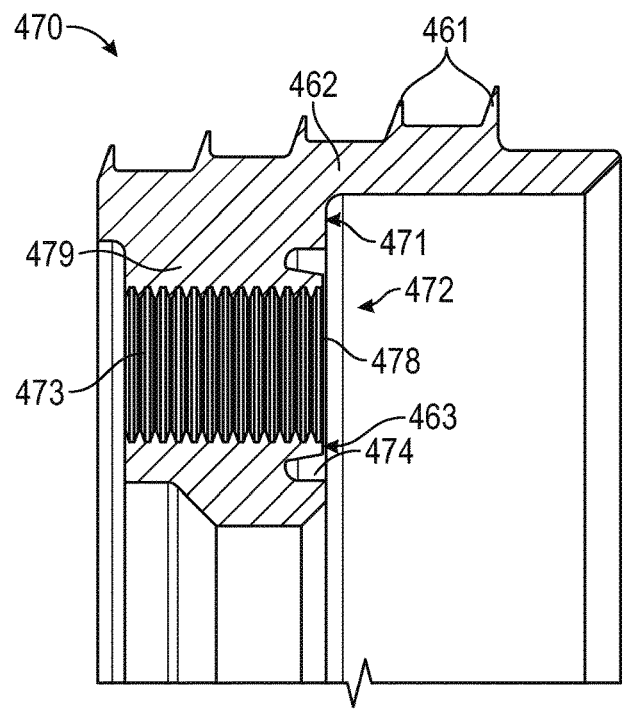
FIG. 8 is a cross-sectional view of the portion of the turbine seal taken along line VIII-VIII of FIG. 7.

FIG. 7 is a perspective view of the turbine seal 470 of FIG. 1. FIG. 8 is a cross-sectional view of the portion of the turbine seal 470 taken along line VIII-VIII of FIG. 7. Referring to FIGS. 7 and 8, the turbine seal 470 may include a seal portion 462, a sealing element 461, a seal flange body 479 and seal threaded features 472. The seal portion 462 may include an annular shape. The sealing element 461 extends from the seal portion 462 to form all or a portion of a seal, such as a labyrinth seal. The sealing element 461 may extend radially in a direction opposite the seal flange body 479, such as radially outward or radially inward, relative to the center axis 95. In some embodiments, the sealing element 461 may extend in the axial direction relative to the center axis 95. In the embodiment illustrated, the sealing element 461 is formed of sealing teeth that are radially projecting sealing flanges with an annular shape.

The seal flange body 479 may extend radially outward or radially inward from the seal portion 462, and may include an annular shape. The seal flange body 479 may include any of the features shown or described in conjunction with the flange body 79 of FIGS. 2-5, such as a seal surface 471. The seal flange body 479 may include a flange opening 489. The flange opening 489 may be located adjacent to or opposite the seal portion 462.

Each seal threaded feature 472 may include any of the features and elements shown or described in conjunction with the threaded feature 72 of FIGS. 2-5, such as a seal threaded portion 473, a seal relief portion 474, a seal recessed portion 478, and a seal recessed surface 463.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, alloy x, INCONEL, WASPALOY, RENE alloys, HAYNES alloys, alloy 188, alloy 230, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 and combusted. An air and fuel mixture is supplied via fuel injector 310. Energy is extracted from the combustion reaction via the turbine 400 by each stage of the series of turbine disk assemblies 420. This energy can be used to drive pumps, power generators, and the like via the power output coupling 50. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

The components of the gas turbine engine may be subjected to harsh operating conditions including, inter alia, high temperatures, torques, stresses, and strains. The operating life of flanged components joined in fastened joints, such as the joint illustrated in FIGS. 2-4, may be limited by these operating conditions, particularly the fastened joints of rotating flanged components.

The relief portion 74 of the threaded feature 72 may permit elastic displacement of the threads 84 and may distribute the clamp force among multiple threads 84, which may reduce the stress on the first engaged thread 89 and may increase the bolted joint fatigue life.

In some embodiments, the rim portion 78 the upper rim surface 63 are recessed relative to the flange mating surface 71, which may allow for axial displacement of the first engaged thread 89 and may further reduce the stress on the first engaged thread 89.

The preceding detailed description is merely exemplary in nature and is not intended to limit the invention or the application and uses of the invention. The described embodiments are not limited to use in conjunction with a particular type of gas turbine engine or a particular fastened joint of a gas turbine engine. Hence, although the present disclosure, for convenience of explanation, depicts and describes particular embodiments of a fastened joint, it will be appreciated that the fastened joint in accordance with this disclosure can be implemented in various other configurations, can be used with various other types of fastened joints and gas turbine engines, and can be used in other types of machines. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A flanged component for a gas turbine engine, the flanged component comprising:
    a flange body including a flange mating surface that mates with a second mating surface of a second flanged component;
    a threaded feature including
        a threaded portion with threads for receiving a threaded fastener, the threaded portion extending into the flange body from the flange mating surface along a feature axis, and
        a relief portion extending into the flange body from the flange mating surface located outward from the threaded portion relative to the feature axis forming a rim portion therebetween, the rim portion including an upper rim surface having an annular shape parallel to the flange mating surface, and the relief portion including an inner surface on the rim portion extending from the upper rim surface and away from the flange mating surface, the inner surface having a frustoconical shape that tapers outward from the upper rim surface.

2. The flanged component of claim 1, wherein the upper rim surface is recessed into the flange body relative to the flange mating surface.

3. The flanged component of claim 1, wherein the relief portion extends into the flange body at a depth of 2 to 3 times a pitch of the threads from the flange mating surface.

4. The flanged component of claim 3, wherein the threaded portion extends through the flange body.

5. The flanged component of claim 1, wherein the relief portion extends into the flange body at a depth of 2 to 3 times a pitch of the threads from a first engaged thread that is the thread closest to the flange mating surface.

6. The flanged component of claim 1, further comprising:
a seal portion;
a sealing element extending from the seal portion; and
wherein the flange body extends radially from the seal portion, and the sealing element extends in a direction opposite the flange body.

7. The flanged component of claim 6, wherein the flanged component is a turbine seal and the sealing element is formed of radially projecting annular flanges extending radially outward from the seal portion.

8. A flanged component for a gas turbine engine, the flanged component comprising:
a flange body including a flange mating surface;
a plurality of threaded features, each threaded feature including
a threaded portion with threads for receiving a threaded fastener, the threaded portion extending into the flange body from the flange mating surface along a feature axis normal to the flange mating surface, and
a relief portion extending into the flange body from the flange mating surface located radially outward from the threaded portion relative to the feature axis, the relief portion including an inner surface having a frustoconical shape that tapers outward as the inner surface extends in a direction opposite the flange mating surface; and
the threaded portion and the relief portion form a rim portion therebetween.

9. The flanged component of claim 8, wherein the rim portion includes an upper rim surface that is recessed into the flange body relative to the flange mating surface.

10. The flanged component of claim 9, wherein the inner surface extends from the upper rim surface, wherein the relief portion further includes an outer surface located radially outward from the inner surface and extending into the flange body from the flange mating surface, the outer surface having a right circular cylinder shape.

11. The flanged component of claim 10, wherein the inner surface and the outer surface extend to a recess base that is rounded between the inner surface and the outer surface.

12. The flanged component of claim 8, wherein the relief portion extends into the flange body at a relief portion depth of 2 to 3 times a pitch of the threads from the flange mating surface.

13. The flanged component of claim 8, wherein the relief portion extends into the flange body at a relief portion depth of 2 to 3 times a pitch of the threads from a first engaged thread that is the thread closest to the flange mating surface.

14. The flanged component of claim 8, wherein the flanged component is a turbine seal, the flanged component further including a seal portion and seal teeth extending from the seal portion, and wherein the flange body extends radially from the seal portion.

15. A fastened joint of a gas turbine engine, the fastened joint comprising:
a first flanged component including
a flange body including a flange mating surface,
a plurality of threaded features, each threaded feature including
a threaded portion including threads, the threaded portion extending into the flange body from the flange mating surface along a feature axis normal to the flange mating surface, and
a relief portion extending into the flange body from the flange mating surface located outward from the threaded portion relative to the feature axis forming a rim portion therebetween, the rim portion including an upper rim surface with an annular shape parallel to the flange mating surface, and the relief portion including an inner surface on the rim portion extending from the upper rim surface and away from the flange mating surface, the inner surface having a frustoconical shape that tapers outward from the upper rim surface;
a second flanged component including a second mating surface adjoining the flange mating surface and a plurality of second flange through holes; and
a plurality of fasteners, each including a fastener head and a fastener shank extending through one of the plurality of second flange through holes and threaded into the threaded portion of one of the plurality of threaded features.

16. The fastened joint of claim 15, wherein the upper rim surface is recessed into the flange body relative to the flange mating surface and is adjacent to the second mating surface.

17. The fastened joint of claim 15, wherein the relief portion extends into the flange body at a relief portion depth of 2 to 3 times a pitch of the threads from the flange mating surface.

18. The fastened joint of claim 15, wherein the relief portion extends into the flange body at a relief portion depth of 2 to 3 times a pitch of the threads from a first engaged thread that is the thread closest to the flange mating surface and closest to the fastener head.

19. The fastened joint of claim 15, wherein the first flanged component further comprises:
a seal portion;
a sealing element extending from the seal portion; and
wherein the flange body extends radially from the seal portion.

20. The fastened joint of claim 15, wherein the inner surface extends from the upper rim surface, wherein the relief portion further includes an outer surface located radially outward from the inner surface and extending into the flange body from the flange mating surface, the outer surface including a right circular cylinder shape, and wherein the inner surface and the outer surface extend to a recess base that is rounded between the inner surface and the outer surface.

* * * * *